DIGITAL FREQUENCY AND PHASE DETECTOR

Filed Jan. 12, 1965

INVENTOR.
ROBERT P. BURR
BY
Charles A. Blank
ATTORNEY

United States Patent Office 3,381,220
Patented Apr. 30, 1968

3,381,220
DIGITAL FREQUENCY AND PHASE DETECTOR
Robert P. Burr, Huntington, N.Y., assignor to Circuit Research Company, Glen Cove, N.Y., a partnership of New York
Filed Jan. 12, 1965, Ser. No. 425,006
11 Claims. (Cl. 324—82)

ABSTRACT OF THE DISCLOSURE

A frequency and phase detector, including a center bistable circuit responsive to pulses from two separate input sources for providing a phase comparison when the input frequencies are the same and a pair of additional bistable circuits for maintaining the center bistable circuit in a selected one of its states when the input frequencies are different.

This invention relates to digital frequency and phase detectors and to servo systems utilizing such detectors. Such detectors may, for example, be utilized in applications including communication systems, digital control systems, and precise electromechanical speed drive systems.

Prior frequency and phase detectors ordinarily utilize resonant frequency-selective networks such as discriminators and tuned circuits. Such prior detectors have the limitation that they are capable of operating only at a predetermined reference frequency and require adjustment to operate at a different reference frequency. Accordingly, such prior detectors are not suitable for use in, for example, motor drive systems wherein the speed of the motor is precisely controlled in accordance with the frequency of a reference clock signal, which may vary over a wide frequency range.

It is an object of the present invention, therefore, to provide a new and improved frequency and phase detector which avoids one or more of the above-mentioned disadvantages of prior such detectors.

It is another object of the invention to provide a new and improved digital frequency and phase detector which is non-selective in frequency, that is, capable of operating over a wide range of reference frequencies.

It is another object of the invention to provide a new and improved digital frequency and phase detector for developing an output signal representative of the frequency relation of input signals when the input signals have different frequencies and for developing a digital output signal representative of the phase relation of the input signals when the input signals have the same frequency.

It is another object of the invention to provide a new and improved digital servo control system capable of driving a motor at a speed determined by a reference clock signal.

In accordance with the invention, a digital frequency and phase detector for developing an output signal representing the frequency relation of input signals at different frequencies and representing the relative phases of input signals at the same frequency comprises means for supplying first and second input signals having varying frequency and phase relations. The detector includes first circuit means coupled to the supply means for developing an output signal at a first value in response to said first signal and for developing an output signal at a second value in response to the aforesaid second signal while the second signal has a different frequency from the first signal. The detector also includes means coupled to the first circuit means and responsive to the aforesaid output signal of the first circuit means for translating a signal representative thereof with a time-delay. The detector also includes second circuit means coupled to the supply means and to the time-delay means for developing an output signal at one value in response to the aforesaid first signal and at another value in response to the aforesaid second signal when the translated signal has the aforesaid second value for developing a digital output signal at two values when the input signals have the same frequency with the relative durations of the signal values of the digital output signal being determined by the relative phases of the input signals.

For a better understanding of the present invention, together with other and further objects thereof, reference is made to the following description, taken in connection with the accompanying drawings, and its scope will be pointed out in the appended claims.

Referring now to the drawings.

Figure 1:
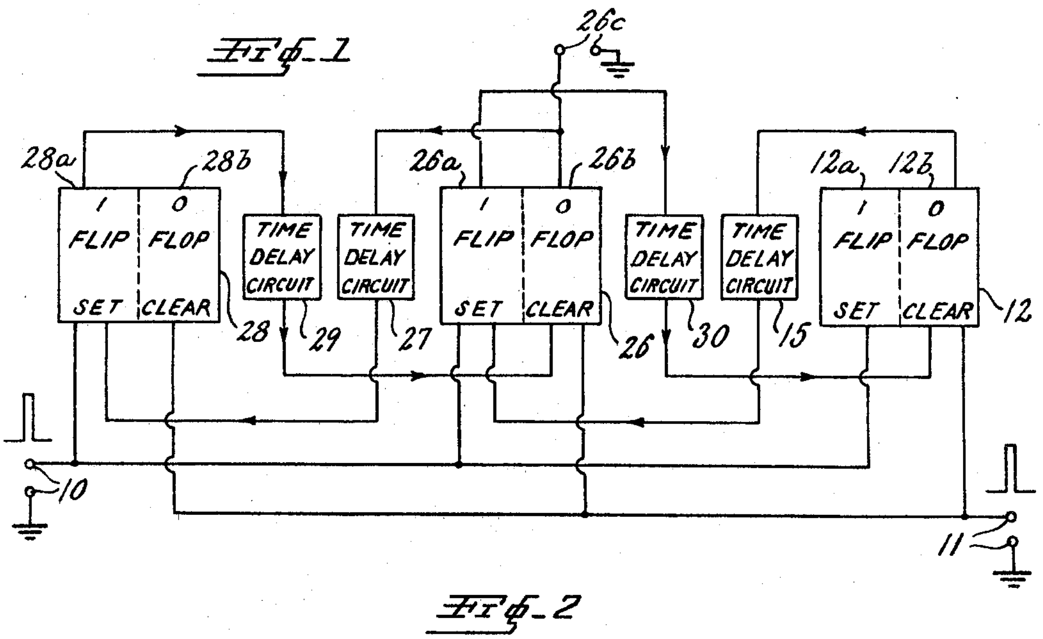
FIG. 1 is a schematic diagram of a frequency and phase detector constructed in accordance with the invention.

Referring now more particularly to FIG. 1 of the drawings, a digital frequency and phase detector constructed in accordance with the invention is there represented for developing an output signal representing the frequency relation of input signals at different frequencies and representing the relative phases of input signals at the same frequency. The detector comprises means for supplying first and second input signals having varying frequency and phase relations. The supply means comprises, for example, terminals 10 for supplying a reference frequency clock signal and terminals 11 for supplying a signal having a frequency to be controlled by the reference frequency clock signal in accordance with the operation of the FIG. 1 frequency and phase detector and the servo system of FIG. 3, which will be more fully described hereinafter.

The detector also includes first circuit means coupled to the supply circuit means for developing an output signal at a first value in response to the first signal and for developing an output signal at a second value in response to the second signal while the second signal has a different frequency from the first signal, for example, a lower frequency than the first signal. More particularly, the first circuit means comprises a bistable flip-flop 12 having SET and CLEAR input circuits 13 and 14, respectively, connected to the reference frequency clock signal input terminals 10 and the controlled frequency signal input terminals 11, respectively. The operating condition of the flip-flop 12 in the CLEAR condition is represented by the numerals 1 and 0 to indicate relative amplitude levels in the output circuits **12*a*, 12*b*** of the flip-flop.

The detector also includes time-delay means coupled to the first circuit means for translating the output signal of the first circuit means with a time-delay. This time-delay means preferably comprises a suitable low-pass filter delay circuit 15 of FIG. 1.

Figure 2:
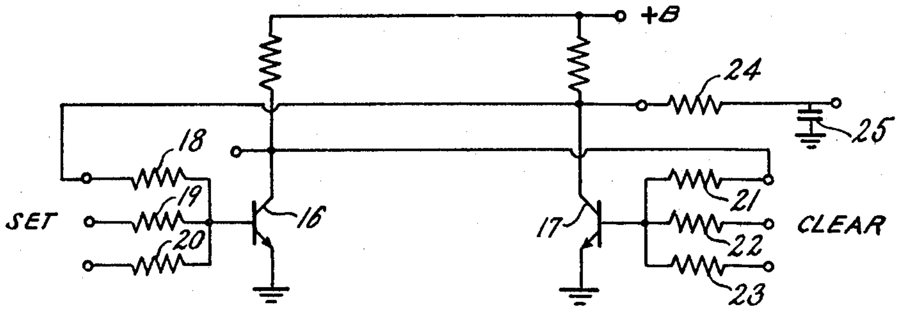
FIG. 2 is a circuit diagram of a flip-flop circuit and time-delay circuit utilized in the FIG. 1 detector.

The flip-flop 12 and time-delay means 15 are represented in detail in FIG. 2. The flip-flop comprises intercoupled transistors 16, 17 having emitter-base input circuits and emitter-collector output circuits. Resistors 18, 19 and 20 in conjunction with transistor 16 effectively form a NAND gate circuit. The resistor 18 is connected to the collector of transistor 17, and the resistor 19 is connected to the reference frequency clock signal input terminal 10. The resistor 20 is not operatively connected in the flip-flop 12 and may be omitted from the flip-flop circuit 12, but has a counterpart in another flip-flop more fully described hereinafter and is represented for explanatory purposes in FIG. 2.

The base input circuit resistors 21, 22, 23 in conjunction with the transistor 17 form effectively a NAND circuit with the resistor 21 connected to the collector of transistor 16 and the resistor 22 connected to the control frequency signal input terminal 11. The resistor 23 serves no function in the flip-flop 12 of FIG. 2 and may be omitted but an analogous resistor of another flip-flop of FIG. 1 is utilized in a manner more fully described subsequently.

The time-delay circuit 15 preferably comprises a suitable delay network formed by resistor and condenser 24 and 25 with the signal translated through the delay circuit being the signal developed across the condenser 25.

When the input signals to the flip-flop are pulse-type signals, the time delay provided by the time-delay circuit 15 is predetermined to be at least slightly longer than the duration of the reference frequency clock input pulse and preferably is a delay many times greater than the duration of the clock input pulse. The time delay provided by circuit 15 is substantially less than the repetition period of the clock pulses. For example, if the clock input pulse is one-tenth microsecond duration at a frequency of 100 kilocycles, the delay time is at least one-tenth microsecond and may, for example, be 1.7 microseconds.

The detector also includes second circuit means coupled to the supply means and to the time-delay means for developing an output signal at one value in response to the first or reference clock signal and at another value in response to the second or controlled frequency signal when the signal translated by the time-delay means has the second value for developing a digital output signal at two selected values when the input signals have the same frequency with the relative durations of the signal values of the digital output signal being determined by the relative phases of the input signals. More particularly, the second circuit means comprises a second flip-flop circuit 26 similar to the flip-flop 12 having one SET input circuit resistor connected to the reference frequency clock signal supply terminals 10 and having another SET input circuit resistor connected to the time-delay circuit 15. For example, a resistor of the flip-flop 26 corresponding to the resistor 20 of the flip-flop 12 represented in FIG. 2 is connected to the condenser 25 of FIG. 2.

The output circuit **26*b* of the flip-flop 26 is connected to a time-delay circuit 27 similar to the time-delay circuit 15 for translating the output signal of the flip-flop 26 with a predetermined time-delay to another flip-flop 28** more fully described subsequently.

The output circuit **26*a* of the flip-flop circuit 26 is connected through a time-delay circuit 30 similar to the time-delay circuit 15 and providing a similar time-delay in signal propagation to the CLEAR input circuit of the flip-flop 12, and, more particularly, to a resistor thereof corresponding to the resistor 23** of FIG. 2.

The detector also includes third circuit means coupled to the supply means and coupled through time-delay means 27 to the output circuit of the second circuit means 26 for developing an output signal at a first value in response to the first or reference clock signal and for developing an output signal at a second value in response to the second or controlled frequency signal while the second signal has a higher frequency than the first signal. This third circuit means comprises the flip-flop 28 which may be a similar construction to the flip-flops 12 and 26 having its SET input circuit connected to the reference frequency clock signal supply terminals 10 and to the time-delay circuit 27. The CLEAR input circuit of the flip-flop 28 is connected to the controlled frequency signal-supply terminals 11. The third resistor of the CLEAR input circuit of the flip-flop 28 corresponding to resistor 23 of FIG. 2 may be omitted. The output circuit **28*a* of the SET section of the flip-flop 28 is coupled to the CLEAR input circuit of the flip-flop 26 through a time-delay circuit 29** similar to the time-delay circuits.

Considering now the opertaion of the FIG. 1 phase detector, it will be assumed initially that the three flip-flops 12, 26 and 28 are in the operating conditions indicated by the digital notations 1 and 0 corresponding to a CLEAR condition. Because the flip-flop 28 is in the CLEAR condition, the 1 output signal of the output circuit **28*a* maintains the flip-flop 26 in the CLEAR condition through time-delay circuit 29. Similarly, the 1 output signal of the section 26*a* of the flip-flop 26 maintains the flip-flop 12 in the CLEAR condition through time-delay circuit 30**.

Assuming that the reference frequency clock signal has a substantially higher frequency than the frequency of the signal supplied at terminals 11, when a first reference frequency clock pulse is applied to the SET input circuits of flip-flops 28, 26 and 12, only flip-flop 28 is triggered or SET, causing the output signal of the output circuit **28*a* to assume a 0 value. Flip-flop 26 is not triggered or SET even though the clock pulse is applied thereto because the signal having a 1 level supplied through the delay circuit 29 maintains the flip-flop 26 in the CLEAR conditions immediately after the clock pulse. Similarly, flip-flop 12** is not SET by the first clock pulse.

Upon the occurrence of the second clock pulse, the output signal of the delay circuit 29 has assumed the 0 level and thus, upon the occurrences of the second clock pulse, the flip-flop 26 is triggered or SET, causing the output signal of section **26*a* to assume a 0 level and the output signal of section 26*b*** to assume a 1 level.

Upon the occurrence of the second clock pulse, the flip-flop 12 is not SET because the output signal of the delay circuit 30 at that time is at the 1 level.

When the third clock pulse occurs, the flip-flop 12 is SET because the output signal of the delay circuit 30 is 0 at that time.

In accordance with the operation just described, a succession of three clock pulses without an intervening arrival of a pulse of the controlled frequency signal causes the flip-flops 28, 26 and 12, respectively, to be SET in that order. Analogously, the arrival of three pulses of the controlled frequency signal without the arrival of an intervening clock pulse causes the flip-flops 12, 26 and 28 to assume the CLEAR condition sequentially in that order.

It should be understood that there could be as many flip-flops as desired extending in the chain. The operation of the series of flip-flops would proceed in a similar manner with clock pulses causing the flip-flops successively to assume SET states in one order and with controlled frequency pulses successively causing the flip-flops to assume CLEAR states in the reverse order.

Considering now the operation of the FIG. 1 detector when an input signal of succesive clock pulses occurring at a predetermined frequency is supplied from terminals 10, 10 and an input signal of pulses of frequency to be controlled is supplied from terminals 11, 11, it will be assumed initially that the reference frequency clock pulses have a frequency higher than the frequency of the controlled frequency input signal. Under this operating condition, the flip-flops 28 and 26 assume the SET operating condition while the flip-flop 12 occasionally changes from SET to CLEAR operating condition. This is because the application of the clock pulses from the supply terminals 11, immediately causes the flip-flops to assume the SET condition in accordance with the operation previously described since there are many more clock pulses than there are controlled frequency pulses. Occasionally, however, a controlled frequency pulse is supplied from terminals 11 and causes the flip-flop 12 to assume the CLEAR condition. However, before another controlled frequency pulse arrives, the flip-flop 12 is returned to the SET condition by the reference frequency clock pulses which occur much more frequently.

Assuming now that the reference frequency clock pulses occur at a frequency slightly higher than the controlled frequency pulses, the flip-flop 12 changes its operating condition from SET to CLEAR at a rate determined by the frequency relation of the input pulses. If it is assumed that the frequency of the control frequency signal gradually approaches the reference frequency until the frequencies of the two signals are the same, the flip-flop 12 will then be alternately set by the reference frequency clock pulses and cleared by the controlled frequency pulses. So long as the controlled frequency remains the same as the reference frequency, the flip-flop 12 is alternately set and cleared while flip-flops 28 and 26 remain in the SET condition.

Considering now the output signals developed in the flip-flop 26, during all the previously described operating conditions the flip-flop 26 has been in the SET condition, thereby developing a 1 output signal at circuit **26*b*. As will be more fully explained in connection with FIG. 3, this signal can be utilized in a digital servo system to increase the frequency of the controlled frequency pulses. When utilized in such a servo system, so long as the output 1 is obtained from the circuit 26*b* of the flip-flop 26, the frequency of the controlled frequency pulses increases. Eventually, the increase in frequency of the controlled frequency pulses results in a condition in which two successive controlled frequency pulses occur without an intervening arrival of a reference frequency clock pulse. When this condition occurs, the flip-flop 12 remains cleared and upon the arrival of the second controlled frequency pulse, the flip-flop 26 is cleared because at that time the output signal of the delay circuit 15 is at the 0 level, allowing the controlled frequency pulse to be effective as a CLEAR pulse in the flip-flop 26. When the flip-flop 26 assumes the CLEAR operating condition, the flip-flop 26 develops a 0 output signal in the section 26*b*, which signal, as will be explained subsequently, can be effective in a servo system to cause the controlled frequency pulse rate to decrease. When the next reference frequency clock pulse is supplied from the terminals 10, the flip-flop 26 is triggered into the SET condition, causing the output signal of the section 26*b* to occur at the 1 level, thereby tending to increase the controlled frequency. So long as the frequencies of the reference clock pulses and the controlled frequency pulses remain the same, the flip-flop 26 switches alternately from the SET to the CLEAR operating conditions. During this operating condition, the output signal of the section 26*a* of the flip-flop 26 translated through delay circuit 30 is effective to maintain the flip-flop 12** in the CLEAR condition.

While the frequencies of the reference frequency clock pulses and the controlled frequency pulses remain the same, any phase variation of the controlled frequency pulses relative to the reference frequency clock pulses results in a phase variation of the switching times of the flip-flop 26, thereby developing a digital output signal with the relative durations of the signal values being determined by the relative phases of the input signals.

Assuming for the moment that the controlled frequency pulses occur at a higher frequency than the reference frequency clock pulses, so that two successive controlled frequency pulses again occur without an intervening reference frequency clock pulse, the flip-flop 26 will be cleared and, upon the occurrence of the second successive clock pulse, the flip-flop 28 is cleared with the output signal of the section **28*a* being translated with a time delay through the time-delay circuit 29 to maintain the fiip-flop 26 in the CLEAR condition while the frequency of the controlled frequency pulses is higher than the frequency of the reference frequency clock pulses. The flip-flop circuit 28** switches to the SET condition upon the occurrence of reference frequency clock pulses, and returns to the CLEAR state upon the more frequent occurrence of the controlled frequency pulses.

Figure 3:
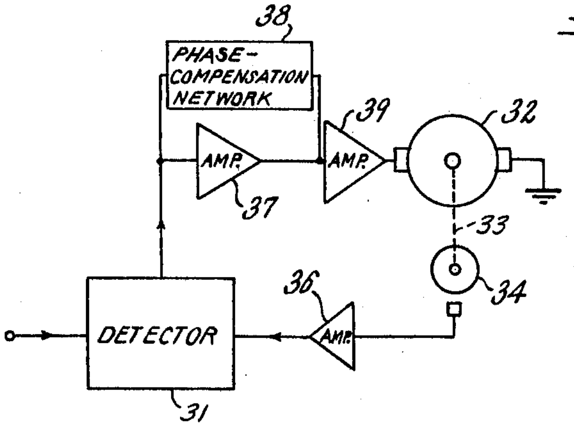
FIG. 3 is a schematic diagram of a servo system comprising a motor drive system constructed in accordance with the invention.

Referring now to FIG. 3, there is represented a servo system suitable as a motor control drive system constructed in accordance with the invention and utilizing the FIG. 1 frequency and phase detector. Reference frequency pulses for controlling the operating speed of a low inertia direct-current motor for example, a printed-circuit motor 32, are applied to a digital frequency and phase detector 31 similar to the FIG. 1 frequency and phase detector. The motor 32 preferably has mounted on armature shaft 33 a suitable pulse-generating device for developing pulses in accordance with the speed of the motor. The pulse-generating device may be, for example, an optical disk 34 in combination with a photocell 35 or may be suitable magnetic pulse pick off apparatus. The pulses representative of the speed of the motor are supplied through a pick off amplifier 36 as control frequency input pulses to the detector 31.

The detector 31 operates in accordance with the previous explanation to develop an output signal having a 1 output level when the reference frequency input pulses are at a higher frequency than the pulses supplied by the pick off amplifier. This signal is supplied through a suitable amplifier and phase compensation network 37, 38 and a power amplifier 39 to the motor 32 to increase the speed of the motor. When the speed of the motor increases sufficiently that the frequency of the pulses supplied by the pick off amplifier is the same as the reference frequency, the detector 31 supplies a digital output signal automatically switching between 1 and 0 values to repeatedly energize and de-energize the motor. The motor then continues to rotate at the desired speed, supplying pick off pulses at the same frequency as the reference frequency pulses. Small variations in the loading of the motor requiring torque variations result in phase delays of the pulses picked off the optical disk and result in a phase variation of the switching times of the digital output signal of the detector 31.

If for any reason the motor speed becomes such that the frequency of the pick off pulses is greater than the frequency of the reference frequency clock pulses, the output signal of the detector 31 assumes a 0 value, causing the motor speed to decrease and causing the frequency of the pulses picked off the optical disk to return to the reference frequency. In this manner, a precise speed control of the motor can be obtained with a phase lock condition when the motor is operating at the proper speed since phase variations of the pick off pulses result in correcting phase variations of the digital output signal of fiip-flop 26.

Figure 4:
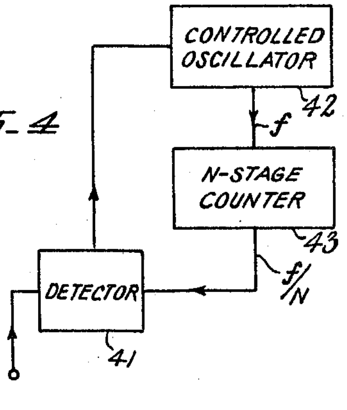
FIG. 4 is a schematic diagram of an oscillator control system utilizing a detector constructed in accordance with the invention.

Referring for the moment to FIG. 4, a detector 41 similar to the FIG. 1 detector may be utilized to provide an output signal for controlling the frequency of an oscillator which supplies its output signal through a suitable frequency-reducing counter 43 to the controlled frequency input terminals of the detector 41. The oscillator 42 may be of a type which responds to the average value of the digital output signal of the detector 41. The reference frequency input signal and the controlled frequency signal applied to the detector 41 are both pulse-type signals.

From the foregoing description, it will be apparent that a digital frequency and phase detector constructed in accordance with the invention has the advantage that it is capable of operating over a wide range of selected reference frequencies without requiring adjustment of the circuit parameter. The detector is suitable for use in a servo system for controlling precisely the speed of a motor in accordance with frequency of a reference clock signal. The reference frequency may be varied over a range extending to, for example, 600 kilocycles per second when a resistor-condenser time-delay circuits are utilized.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A frequency control servo system comprising:
 a reference source for providing a first pulse train at a predetermined frequency;
 a controlled frequency source for providing a second pulse train;
 a bistable circuit coupled to said sources and urged toward one stable state in response to a pulse from said reference source and toward the other stable state in response to a pulse from said controlled source;
 a coupling circuit between said bistable circuit and said controlled source for increasing the frequency of said controlled source when said bistable circuit is in one stable state and for decreasing the frequency of said controlled source when said bistable circuit is in the other stable state;
 first circuit means responsive to said first and second pulse trains and operatively connected to maintain said bistable circuit in said one stable state when the frequency of said second pulse train is less than said predetermined frequency; and
 second circuit means responsive to said first and second pulse trains and operatively connected to maintain said bistable circuit in said other stable state when the frequency of said second pulse train is greater than said predetermined frequency.

2. A frequency controlled servo system according to claim 1 wherein said controlled frequency source comprises a variable speed motor coupled to a pulse generator for providing said second pulse train having a frequency proportional to the speed of said motor.

3. A frequency controlled servo system according to claim 1 wherein said cotnrolled frequency source comprises a variable frequency oscillator.

4. A frequency controlled servo system according to claim 1 wherein said first and second circuit means each includes a bistable circuit.

5. A frequency controlled servo system according to claim 4 wherein said three bistable circuits are interconnected by time delay circuits.

6. A digital frequency and phase detector for developing output signals representing the frequency relation of input signals of different frequencies and representing the phase relation of input signals at the same frequency, comprising;
 a bistable circuit for providing the output signals and having first and second stable states;
 a first coupling circuit connected to said bistable circuit for applying pulses from a first source to urge said bistable circuit into said first stable state;
 a second coupling circuit connected to said bistable circuit for applying pulses from a second source to urge said bistable circuit into said second stable state; and
 circuit means responsive to pulses from the first and second sources and operatively coupled to maintain said bistable circuit in one of said stable states when the frequency of pulses from the first souce is higher than the frequency of pulses from the second source.

7. A digital frequency and phase detector according to claim 6, further including
 circuit means responsive to pulses from the first and second sources and operatively coupled to maintain said bistable circuit in the other of said stable states when the frequency of pulses from the second source is higher than the frequency of pulses from the first source.

8. A digital frequency and phase detector for developing output signals representing the frequency relation of input signals of different frequencies and representing the phase relation of input signals at the same frequency, comprising;
 means for supplying first and second input signals having varying frequency and phase relations;
 at least a first and second bistable circuit, each of said bistable circuits
  being coupled to said supply means for receiving said input signals, and
  being urged into a first stable state in response to said first signal and into a second stable state in response to said second signal;
 circuit means for so interconnecting said first and second bistable circuits that said first bistable circuit, when in one of its states, inhibits a change of state of said second bistable circuit; and
 output circuit means coupled to said second bistable circuit to provide output signals of two discrete levels corresponding respectively to the states of said second bistable circuit,
  the relative durations of the output signals at said discrete levels being determined by the relative phases of said input signals when their frequencies are the same, and
  the output signal being sustained at one of said levels when certain frequency differences exist between said input signals.

9. A digital frequency and phase detector for developing an output signal representing the frequency relation of input signals at different frequencies and representing the relative phases of input signals at the same frequency, comprising:
 an input circuit for receiving a first and second pulse train;
 first, second and third bistable circuits each coupled to said input circuit, pulses in said first pulse train urging said bistable circuits toward one stable state and pulse in said second pulse train urging said bistable circuits toward the other stable state;
 an output circuit coupled to said first bistable circuit for providing ouput signals corresponding to the then existing stable state therein;
 circuit means for so coupling said first and second bistable circuits that said first bistable circuit is maintained in its one stable state when the frequency of said first pulse train is greater than the frequency of said second pulse train; and
 circuit means for so coupling said first and third bistable circuits that said first bistable circuit is maintained in its other stable state when the frequency of said second pulse train is greater than the frequency of said first pulse train.

10. A digital frequency and phase detector comprising:
three bistable circuits each having a "1" and "0" state;
 circuit means for applyling input pulses from a first and a second source to said bistable circuits to urge said circuits into the "1" and "0" states, respectively; and
 circuit means for so interconnecting said bistable circuits that
  the states of the bistable circuits change from "000," to "001," to "011," to "111" in response to four successive pulses from said first source and the states of the bistable circuits change from "111" to "011" to "001" to "000" in response to four successive pulses from said second source.

11. A digital frequency and phase detector according to claim 10 wherein said interconnecting circuit means comprises time delay circuits.

References Cited

UNITED STATES PATENTS

| | | | |
|---|---|---|---|
| 2,794,123 | 5/1957 | Younker | 328—55 |
| 3,069,623 | 12/1962 | Murgio | 324—79 |
| 3,177,428 | 4/1965 | Klayman | 328—151 |
| 3,187,262 | 6/1965 | Crane | 324—82 |
| 3,233,180 | 2/1966 | Eddy | 324—79 X |

RUDOLPH V. ROLINEC, *Primary Examiner.*

P. F. WILLE, *Assistant Examiner.*